United States Patent [19]

Imaoka

[11] Patent Number: 5,758,206
[45] Date of Patent: May 26, 1998

[54] LENS POSITION CONTROL DEVICE FOR A ZOOM LENS

[75] Inventor: Yasunori Imaoka, Yokohama, Japan

[73] Assignee: Canon Kabushiki Kaisha, Tokyo, Japan

[21] Appl. No.: 777,475

[22] Filed: Dec. 30, 1996

[30] Foreign Application Priority Data

Jan. 12, 1996 [JP] Japan ................. 8-022002

[51] Int. Cl.$^6$ ................................. G03B 13/36
[52] U.S. Cl. ............... 396/80; 348/347; 348/351
[58] Field of Search .............. 396/79–83; 348/351, 348/347; 359/824

[56] References Cited

U.S. PATENT DOCUMENTS

| | | | |
|---|---|---|---|
| 4,920,420 | 4/1990 | Sano et al. | 348/351 X |
| 4,924,317 | 5/1990 | Hirao et al. | 348/351 |
| 5,091,802 | 2/1992 | Imaoka et al. | 359/694 |
| 5,212,598 | 5/1993 | Kikuchi | 396/79 X |
| 5,352,882 | 10/1994 | Koyanagi et al. | 396/79 X |
| 5,543,840 | 8/1996 | Hirota | 348/347 X |
| 5,600,372 | 2/1997 | Cha | 348/347 X |
| 5,687,403 | 11/1997 | Ohtake | 396/82 |
| 5,689,738 | 11/1997 | Uziie et al. | 396/79 |

*Primary Examiner*—W. B. Perkey
*Attorney, Agent, or Firm*—Fitzpatrick, Cella, Harper & Scinto

[57] ABSTRACT

This specification discloses a lens position control device in which the focusing lens of a zoom lens is moved on the basis of the output signal of image pickup means provided on the image plane of the zoom lens to thereby effect focus adjustment and which achieves flange back adjustment in such a manner as to change the reference position of a wobbling lens wobbling back and forth in the direction of an optical axis having a predetermined position as the reference in order to detect the focus state, and the automatization of the flange back adjustment.

5 Claims, 3 Drawing Sheets

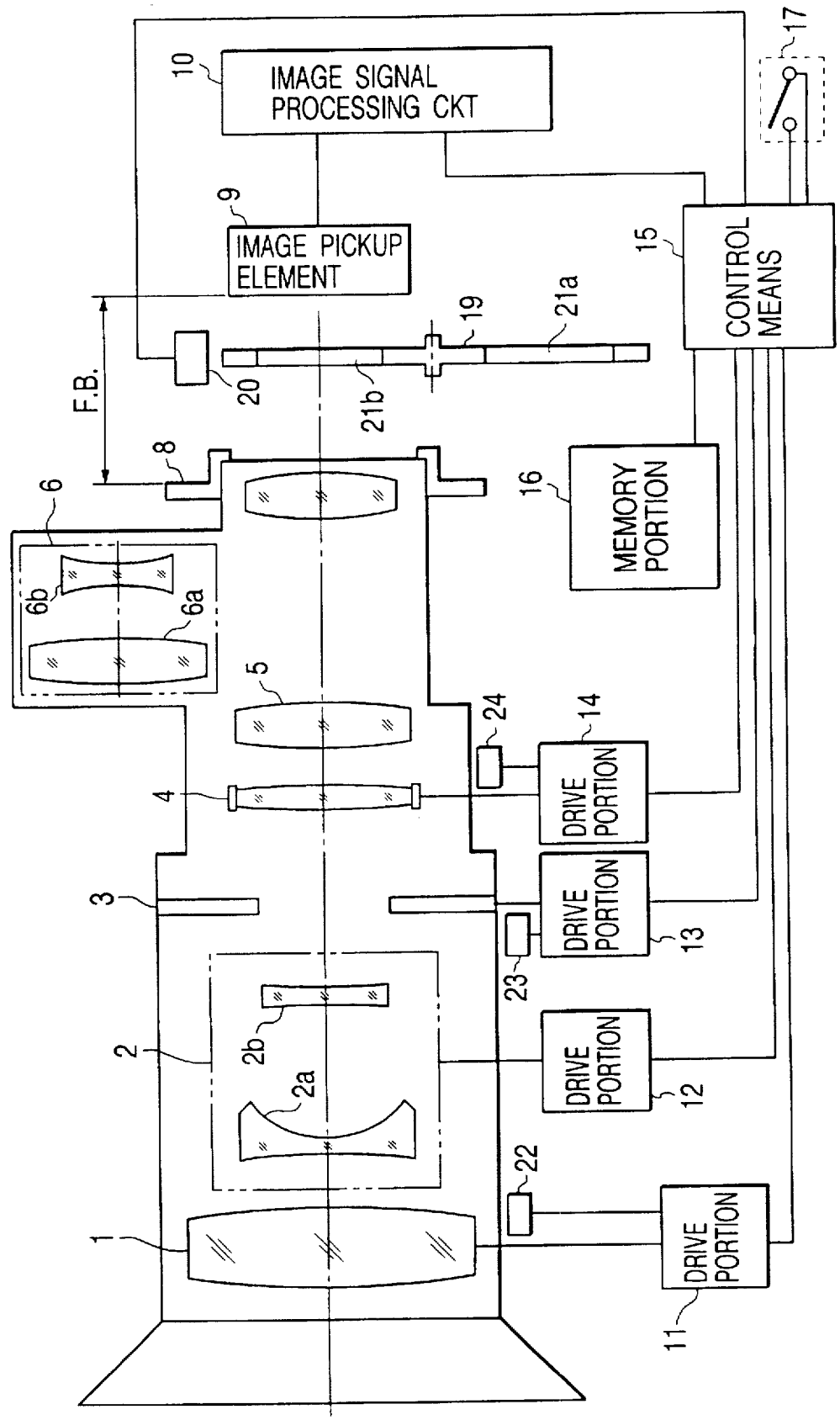

LENS POSITION CONTROL DEVICE FOR A ZOOM LENS

BACKGROUND OF THE INVENTION

1. Field of the Invention

This invention relates to a lens position control device and an optical apparatus using the same, and particularly enables the adjustment of flange back to be simply accomplished in a phototaking lens with the auto focus function in which some lens unit constituting the phototaking lens is reciprocally minutely moved in the direction of the optical axis thereof to thereby effect the detection of the in-focus state.

2. Related Background Art

As one of auto focus methods heretofore used in video camera, television cameras, etc., there is a so-called mountain-climbing method of detecting the degree of minuteness of a phototaking screen from a high frequency component in an image signal obtained by a phototaking lens, and controlling the position of a focusing lens so that the degree of minuteness may become maximum.

The focusing method using this mountain-climbing method utilizes the fact that object light (image) entering the phototaking lens is converted into an electrical signal (video signal) by a signal processing portion and the high frequency component of this electrical signal is little if the focus state of the phototaking lens is improper, and is much if the phototaking lens is in focus.

Specifically, the electrical signal from an image pickup element converted by the signal processing portion is passed through a high-pass filter, whereafter it is detected and integrated for a period during which an image field is formed, i.e., one field period (in the case of the television system, 1/60 sec.) to thereby detect the state of the focus. A focusing lens constituting the phototaking lens is then moved by a motor (drive means) so that a high frequency component may be obtained to thereby obtain the in-focus state. As a method of detecting the direction of out-of-focus (in-focus direction), it has heretofore been usually practised to minutely move (wobble) some lens unit in the phototaking lens back and forth along the direction of the optical axis thereof.

Heretofore, in such a phototaking lens (zoom lens) with the auto focus function, the flange back of the phototaking lens has been adjusted by moving a part or the whole of a relay lens constituting the phototaking lens in the direction of the optical axis thereof in order to adjust the flange back of the phototaking lens to the amount of flange back of a camera (optical apparatus).

Heretofore, in the phototaking lens (zoom lens) with the auto focus function as described above in which some lens unit constituting the phototaking lens is minutely moved to thereby move the focusing lens on the basis of a focus detection signal obtained by the image pickup element, the adjustment of the flange back when the phototaking lens is mounted on a camera body has been done by the use of a part or the whole of the relay lens so that the focal plane may coincide with the image pickup element, and this has led to the tendency that the structure of a relay lens barrel becomes complicated.

Also, for a photographer, it has been necessary to effect the adjustment of flange back without fail when the phototaking lens is to be interchanged, and this has been cumbersome. Particularly when the object is dark, it has been difficult to judge whether the focus has come to the optimum position when the adjustment of flange back is to be effected, and this has led to the problem that the adjustment must be effected many times to thereby determine proper flange back.

Generally, when the work of adjusting flange back is omitted and the phototaking lens is used intactly with the flange back set during the shipping of the phototaking lens, there has been the problem that the minute deviation of the flange back on the phototaking lens side, the mounting accuracy of the image pickup element on the camera body side and the deviation of the flange back due to the variation with time lie one upon another and the out-of-focus or the like during zooming comes to occur.

Further, in a phototaking lens of the automatic focus type in which a focusing lens is driven on the optical axis thereof and is focused thereby, if flange back deviation remains, there has been a case where the operation of forcibly effecting focusing by the movement of a focusing lens unit is caused even when correction must be originally done in the flange back adjusting portion chiefly of a relay lens. At this time, there occurs the inconvenience that when the zoom lens is toward the wide angle because of the relation of the amount of optical effectiveness, the focusing lens unit requires a very great amount of movement and the initially set range of movement becomes deficient. Also, even if the range of movement is within a movable range, the originally unnecessary movement of the focusing lens unit takes place, and this has led to the problem that not only a feeling of physical disorder is given to a photographer, but also excess drive sound is produced or power consumption is increased.

SUMMARY OF THE INVENTION

It is the object of the present invention to provide a lens position control device suitable for a video camera, a television camera or the like in which flange back adjustment when a phototaking lens with the auto focus function in which a movable lens constituting the phototaking lens is reciprocally minutely moved in the direction of the optical axis thereof and at this time, the focusing lens unit of the phototaking lens is moved on the basis of an image signal obtained by image pickup means provided near the image plane of the phototaking lens to thereby perform the focusing operation is mounted on a camera body can be easily and moreover reliably effected by a photographer appropriately utilizing said movable lens and thereby simply operating a switch, and an optical apparatus using the same and a flange back adjusting method.

According to the present invention, an objective lens wherein a focus adjustment is effected on the basis of an output signal of image pickup means provided on an image plane of said objective lens is provided with:

a focusing lens unit;

a wobbling lens unit wobbling back and forth in a direction of an optical axis having a predetermined position as a reference; and changing means for changing the reference position for the purpose of flange back adjustment.

Also, a method of adjusting a flange back of a zoom lens having a focusing lens and a wobbling lens wobbling back and forth in a direction of the optical axis thereof, on the basis of a output signal of image pickup means provided on an image plane of the zoom lens includes:

the first step of setting the zoom lens on a telephoto side;

the second step of moving the focusing lens on the basis of the output signal;

the third step of setting the zoom lens on a wide angle side; and the fourth step of moving the wobbling lens on the basis of the output signal.

BRIEF DESCRIPTION OF THE DRAWINGS

FIG. 3 is a schematic view of the essential portions of Embodiment 3 of the present invention.

DESCRIPTION OF THE PREFERRED EMBODIMENTS

Figure 1:
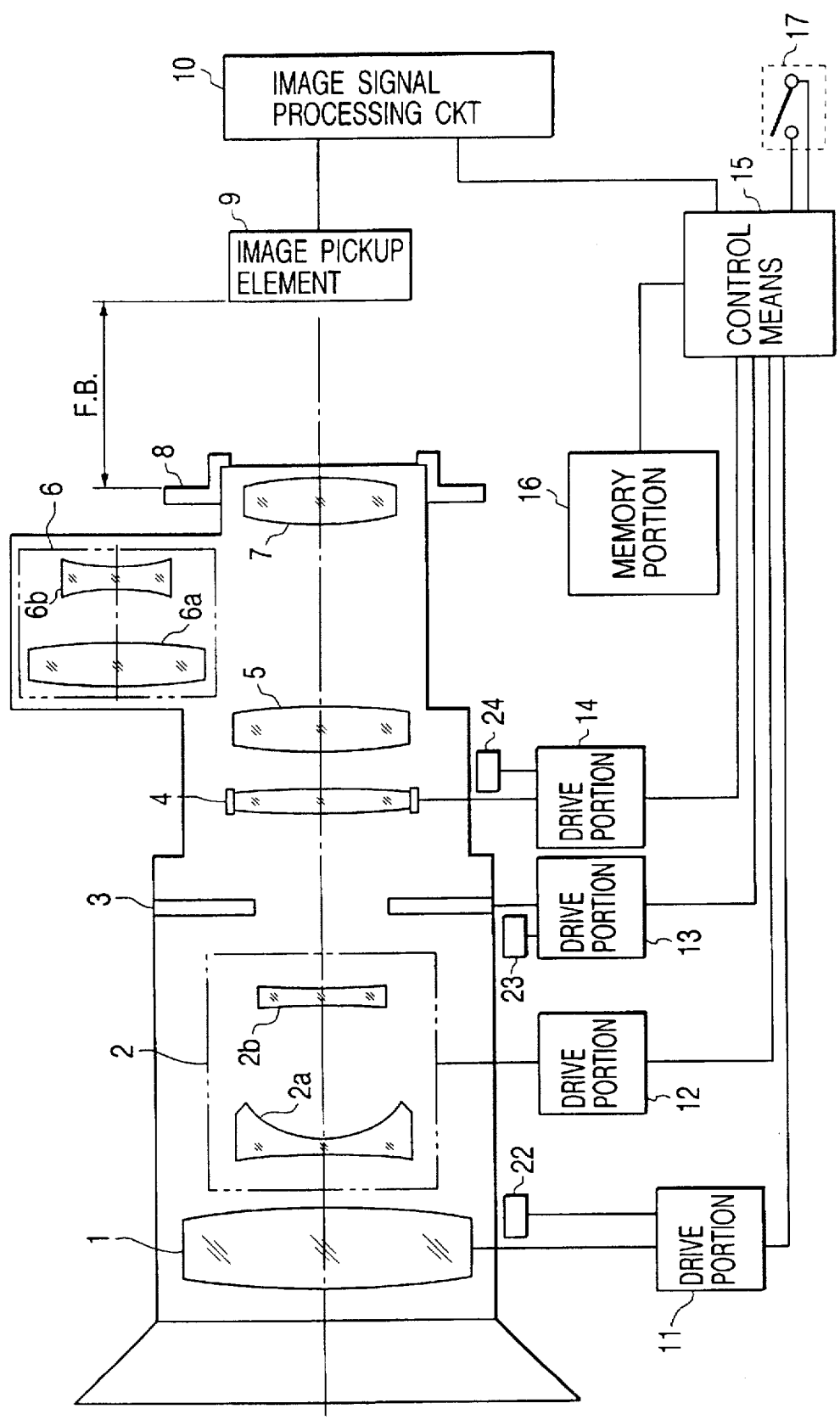
FIG. 1 is a schematic view of the essential portions of Embodiment 1 of the present invention.

FIG. 1 is a schematic view of the essential portions of Embodiment 1 of an optical apparatus using the lens position control device of the present invention. At least members designated by the reference numerals 9, 10 and 15 are provided in a camera body, and the other members are provided in a lens barrel removably mountable on the camera body.

In FIG. 1, the reference numeral 1 designates a focusing lens unit which is moved in the direction of the optical axis thereof by a drive portion 11 to thereby perform the focusing operation. The reference numeral 2 denotes a focal length changing portion which has a variator 2a and a compensator 2b and is moved in the direction of the optical axis by a drive portion 12 to thereby effect focal length change (zooming). The reference numeral 3 designates an aperture portion for adjusting exposure which is driven by a drive portion 13. The reference numeral 4 denotes a movable lens (wobbling lens) which is reciprocally minutely moved in the direction of the optical axis by a drive portion 14 for the purpose of focus detection. The reference numerals 5 and 7 designate relay lens units which effect the imaging action. The reference numeral 9 denotes an image pickup device (image pickup element), and the reference numeral 10 designates an image signal processing circuit which processes an image signal from the image pickup element 9.

The reference numeral 6 denotes an extender which has two lenses 6a and 6b and is removably provided in an optical path and which displaces the focal length range of the entire system. The reference numeral 8 designates a lens mount, and the reference numeral 15 denotes control means (a calculating device) which drives the drive portions 11 and 14 to thereby effect automatic focus detection and which drive-controls the drive portions 12 and 13 to thereby effect the drive control of the entire camera such as focal length change and exposure control. The reference numeral 16 denotes a memory portion storing therein the origin position information or the like of the movable lens 4 as will be described later.

F.B. designates flange back which corresponds to the distance from a lens mount 8 to the image pickup element 9. The reference numeral 17 denotes a switch (starting means) for starting flange back adjustment necessary, for example, when the camera body is changed, and the signal of this switch is inputted to the control means 15. The reference numeral 22 designates a position detector which detects the position of the focusing lens unit 1 in the direction of the optical axis. The reference numeral 23 denotes a position detector which detects the selected aperture diameter of the aperture portion 3. The reference numeral 24 designates a position detector which detects the position of the movable lens (wobbling lens) 4 in the direction of the optical axis. Signals from the position detectors 22, 23 and 24 are inputted to the drive portions 11, 13 and 14, respectively.

In the present embodiment, an auto focus mode (a first mode) in which the focusing lens 1 is moved by a switch (not shown) on the basis of a focus detection signal obtained in the image signal processing circuit 10 and a manual mode (a second mode) in which the focusing lens 1 is moved by an operator's manual operation are selected to thereby perform the phototaking operation. The focusing lens unit 1, the focal length changing portion 2, the movable lens 4 and the relay lens units 5, 7 together constitute a phototaking lens (zoom lens) having a focal length changing portion, and the object image by this phototaking lens is formed on the image pickup device 9.

In the phototaking lens of the present embodiment, under the situation of the first mode in which the focusing operation is performed by the utilization of the image signal obtained from the image pickup device 9, the wobbling lens 4 for focus detection is set so that even if it is minutely reciprocally moved in the direction of the optical axis, the image magnification may hardly vary and only the focus may be out. The wobbling lens 4 is then reciprocally minutely moved in the direction of the optical axis by the drive portion 14 and the focus position on the image pickup surface of the image pickup device 9 is minutely varied to thereby detect any change in the image signal.

The change in the image signal at this time is sent to the control means 15, where the signal is processed to thereby obtain a focus detection signal in which the amount and direction of blur of the focus (in-focus) have been calculated. The control means 15 outputs a drive signal conforming to the amount and direction of blur of the focus, and the focusing lens 1 is driven by the drive portion 11, whereby auto focus is effected. On the other hand, under the manual mode, the photographer moves the focusing lens 1 manually or by a remote operation to thereby perform the focusing operation.

Description will now be made of the flange back adjustment when for example, the lens barrel is mounted on another camera body. When the photographer selects a suitable object and thereafter operates the switch 17, the calculating means 15 once stops the ordinary automatic focusing operation by a signal produced from the switch 17, and the optical apparatus enters an automatic flange back adjustment mode. In the automatic flange back adjustment mode, the aperture 3 is first forcibly set to opening by the drive portion 13 in order to make the depth of field shallow. Subsequently, the zoom lens unit 2 is forcibly zoomed to the most telephoto side (telephoto end) by the drive portion 12.

Thereafter, the wobbling lens 4 is minutely moved with the initially set origin position stored in the memory portion 16 as the reference, and as previously described, similarly to the ordinary automatic focusing operation, the signal obtained from the calculating means 15 is inputted to the drive portion 11, which thus drives the focusing lens unit 1 to the in-focus position. Here, this focusing lens unit 1 is inhibited from moving at its stop position, whereafter the zoom lens unit 2 is driven to the widest angle and (wide end) by the drive portion 12.

Thereafter, the wobbling lens 4 is moved in the direction of the optical axis by the drive portion 14 so as to be focused on the image pickup element 9. Thereby the adjustment of the flange back is effected. During the automatic focusing operation, the wobbling lens 4 is minutely moved to detect only the direction of the focus position and the actual focusing operation is performed with the focusing lens unit 2 moved, but in the automatic flange back adjustment mode, the wobbling lens 4 alone is driven and the in-focus position is detected by the use of the image pickup element 9, the image signal processing circuit 10, etc.

As described above, in the present embodiment, the focus position on the telephoto side and the focus position on the wide angle side are made coincident with each other. That is, the flange back is properly adjusted. In the present embodiment, the hitherto described operation may be repeated again, and according to this, accuracy can be more enhanced. Thereafter, the calculating means 15 newly defines the position of the wobbling lens unit 4 after the adjustment as the origin position, and causes this to be memorized by the memory portion 16. Thereafter, in the automatic focusing operation, the wobbling lens 4 is minutely moved with this position as the origin.

Figure 2:
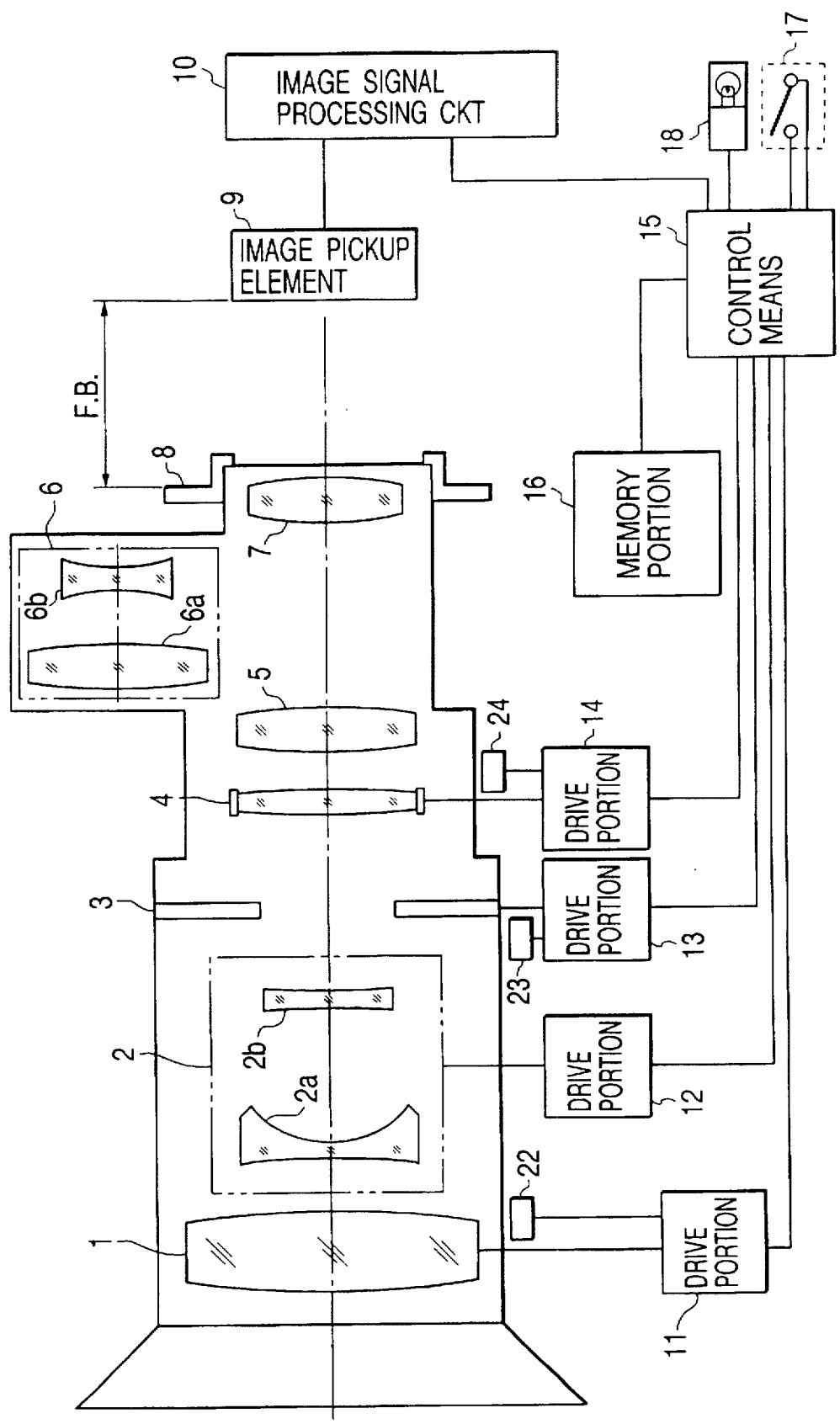
FIG. 2 is a schematic view of the essential portions of Embodiment 2 of the present invention.

FIG. 2 is a schematic view of the essential portions of Embodiment 2 of the present invention. This embodiment differs from Embodiment 1 of FIG. 1 in that provision is made of a display portion 18 displaying that automatic flange back adjustment has been effected and the flange back has been adjusted to a proper flange back, and is the same as Embodiment 1 in the other points.

In FIG. 2, the reference numeral 18 designates the display portion and the other constituents are the same as those in FIG. 1.

Design is made such that when the flange back adjusting operation described with respect to Embodiment 1 is going on, the display portion 18 is flickered to thereby warn the photographer of the impossibility of the ordinary operation, and at a stage whereat the operation has ended, the display portion 18 is turned on so as to display that the flange back has been adjusted.

FIG. 3 is a schematic view of the essential portions of Embodiment 3 of the present invention. This embodiment differs from Embodiment 1 of FIG. 1 in that design is made such that when the object is too bright and proper focus detection cannot be effected if the aperture portion 3 is rendered open during automatic flange back adjustment, a filter for light control disposed on the whole surface of the image pickup element 9 can be automatically selected, and is the same as Embodiment 1 in the other points.

In FIG. 3, the reference numeral 19 denotes a filter disc in which ND filters 21 having several kinds of density are disposed. The reference numeral 20 designates a drive portion which drives the filter disc 19. In FIG. 3, the other constituents are the same as those in FIG. 1.

In the present embodiment, when the illuminance (luminance) of the object is high and the signal output from the image pickup element 9 is too great, the image signal in the image signal processing circuit 10 may be saturated and proper focus position-detection may not be capable of being effected and therefore, design is made such that the image signal level is monitored by the calculating means 15 and a command is sent to the drive portion 20 for the filter disc 19 so that the image signal may assume a proper level and the filter can be selected.

In the present embodiment, design may also be made such that when the object is too bright, the gain of the image signal processing circuit 10 is automatically varied and again by this, proper focus position detection can be effected. Also, when conversely the object is dark, the gain of the image signal processing circuit 10 may be increased and according to this, good flange back adjustment can likewise be accomplished.

According to the present invention, as described above, there can be achieved a lens position control device suitable for a video camera, a television camera or the like in which flange back adjustment when a phototaking lens with the auto focus function in which a movable lens constituting the phototaking lens is reciprocally minutely moved in the direction of the optical axis thereof and at this time, the focusing lens unit of the phototaking lens is moved on the basis of an image signal obtained by image pickup means provided near the image plane of the phototaking lens to thereby perform the focusing operation is mounted on a camera body can be easily and moreover reliably effected by a photographer appropriately utilizing the movable lens and thereby simply operating a switch, and an optical apparatus using the same.

Particularly, according to the present invention, an optical system and a drive system prepared for auto focus control are utilized to thereby automatize flange back adjustment which is always necessary during the interchange of a phototaking lens and before phototaking and which has been cumbersome work, whereby it becomes possible to start phototaking quickly. Also, even in an environment wherein illumination is not sufficient, it becomes possible to effect accurate flange back adjustment, and it is possible to make the most of the performance of the phototaking lens. On the other hand, during assembly adjustment as well, it becomes possible to simplify the flange back adjustment during shipment which has heretofore been done, and it becomes possible to curtail the adjusting work.

Also, it becomes possible to greatly simplify the structure for adjustment, and this leads to the curtailment of the adjusting work and a reduction in the manufacturing cost, while on the other hand, it contributes to the downsizing and lighter weight of the apparatus. Also, in as automatic focus type image pickup apparatus of a type effecting the focusing operation by a focusing lens to which the present invention is directed, accurate flange back adjustment can be effected, whereby the focusing operation of the focusing lens unit particularly during zooming which is originally unnecessary can be curtailed, and the photographer can photograph without a feeling of physical disorder.

Also, even when particularly sound is to be recorded simultaneously with phototaking, it becomes possible to suppress the creation of unnecessary driving sound, and this is effective. Further, the unnecessary operation of the focus drive portion which is considered to be greatest in power consumption is suppressed, whereby the consumed power can be reduced and a longer time of phototaking becomes possible in case of battery drive.

What is claimed is:

1. An objective lens wherein a focus adjustment is effected on the basis of an output signal of image pickup means provided on an image plane of said objective lens including:

a focusing lens unit;

a wobbling lens unit wobbling back and forth in a direction of an optical axis having a predetermined position as a reference; and changing means for changing said reference position.

2. An objective lens according to claim 1, wherein changing of said reference position is performed for flange back adjustment.

3. An objective lens according to claim 2, further including a control circuit for moving said focusing lens unit along said optical axis thereof on the basis of said output signal to thereby perform focus adjustment during ordinary phototaking, and moving said wobbling lens unit along said optical axis thereof so as to change said reference position, on the basis of said output signal, with said focusing lens unit fixed, during the flange back adjustment.

4. A method of adjusting a flange back of a zoom lens having a focusing lens and a wobbling lens wobbling back and forth in a direction of a optical axis thereof, on the basis of an output signal of image pickup means provided on an image plane of said zoom lens including:

the first step of setting said zoom lens on a telephoto side;

the second step of moving said focusing lens on the basis of said output signal;

the third step of setting said zoom lens on the wide angle side; and the fourth step of moving said wobbling lens on a basis of said output signal.

5. A flange back adjusting method according to claim 4, having the sub-step of rendering the aperture of said zoom lens open, between said first step and said second step.

* * * * *

UNITED STATES PATENT AND TRADEMARK OFFICE
CERTIFICATE OF CORRECTION

PATENT NO. : 5,758,206

DATED : May 26, 1998

INVENTOR(S) : Yasunori IMAOKA

It is certified that error appears in the above-identified patent and that said Letters Patent is hereby corrected as shown below:

COLUMN 2:

Line 60, "a output" should read --an output--.

COLUMN 6:

Line 30, "in as" should read --in an--.

COLUMN 7:

Line 3, "a optical" should read --an optical--.

Signed and Sealed this

Eighteenth Day of May, 1999

Attest:

Q. TODD DICKINSON

*Attesting Officer*  Acting Commissioner of Patents and Trademarks